United States Patent [19]

Surratt

[11] Patent Number: 5,076,632
[45] Date of Patent: Dec. 31, 1991

[54] COMPOSITE WINDSHIELD FRAMING STRUCTURE FOR A CONVERTIBLE AUTOMOBILE

[75] Inventor: Stanley C. Surratt, Rochester, Mich.

[73] Assignee: Chrysler Corporation, Highland Park, Mich.

[21] Appl. No.: 696,418

[22] Filed: May 6, 1991

[51] Int. Cl.$^5$ ............................................. B62D 25/10
[52] U.S. Cl. ................................... 296/96.21; 296/70; 296/192; 296/205
[58] Field of Search ..................... 296/90, 96.12, 96.21, 296/84.1, 70, 72, 192, 186, 205, 901

[56] References Cited

U.S. PATENT DOCUMENTS

| 4,679,845 | 7/1987 | Detampel et al. ............... 296/901 X |
| 4,887,861 | 12/1989 | Moch et al. ............................ 296/70 |
| 4,909,566 | 3/1990 | Hashimoto et al. ............... 296/70 X |
| 4,917,435 | 4/1990 | Bonnett et al. .................. 296/901 X |
| 5,009,463 | 4/1991 | Saitoh et al. ................. 296/96.12 X |

FOREIGN PATENT DOCUMENTS

| 535333 | 12/1958 | Belgium ............................. 296/84.1 |
| 39071 | 11/1981 | European Pat. Off. ............ 296/205 |
| 28898 | 5/1964 | German Democratic Rep. ..................................... 296/205 |
| 526159 | 9/1940 | United Kingdom ................. 296/205 |
| 1040469 | 8/1966 | United Kingdom .................. 296/70 |
| 2032360 | 5/1980 | United Kingdom .................. 296/70 |

Primary Examiner—Margaret A. Focarino
Assistant Examiner—Joseph D. Pape
Attorney, Agent, or Firm—Edward A. Craig

[57] ABSTRACT

A composite windshield framing structure is provided for a convertible automobile. The framing structure includes a tubular metallic inner frame which is encapsulated by foam material. A layer of reinforcing fabric impregnated with plastic overlies the foam material and also defines an instrument panel ledge with downwardly extending cowling.

5 Claims, 2 Drawing Sheets

COMPOSITE WINDSHIELD FRAMING STRUCTURE FOR A CONVERTIBLE AUTOMOBILE

BACKGROUND OF THE INVENTION

1. Field of the Invention

This invention relates to a composite windshield framing structure for a convertible automobile, the framing structure including an inner tubular frame encapsulated in foam with a layer of reinforcing plastic impregnated fabric overlying the foam.

2. Prior Art

In the manufacture of convertible automobiles, it is necessary to provide a windshield framing structure as a separate component inasmuch as there is no hard roof and supporting pillar structure which can be used as the basis for defining windshield framing structure. Windshield framing structure for convertible automobiles must be of high strength for the reason that it is a stand alone mechanism. The normal roofing and side pillar structure cannot be relied upon for structural integrity.

It is desirable to provide windshield framing structure for a convertible which is integrated with the instrument panel provided interiorally of the automobile. This structure desirably includes the usual ledge provided adjacent the windshield as well as downwardly extending cowling. A further desirable attribute is to provide such a framing structure which is provided as a composite component which may be mounted on the vehicle as a single unit for ease of assembly at low cost and also a composite unit which may be manufactured in an efficient manner and at low unit cost.

These aims are accomplished in accordance with the composite windshield framing structure for a convertible automobile provided in accordance with the present invention.

SUMMARY OF THE INVENTION

A composite windshield framing structure for a convertible automobile is provided. The structure includes a tubular metallic inner frame including upwardly extending left and right segments interconnected by a crossmember extending between the upper ends thereof. The inner frame further includes an arcuate segment extending rearwardly with respect to the convertible automobile. The arcuate segment interconnects the lower ends of the left and right segments.

Foam material encapsulates the inner frame to define a desired frame configuration. A layer of reinforcing fabricate impregnated with plastic overlies the foam material and further extends across the arcuate segment to define an instrument panel ledge. A windshield is mountable in the area defined by the encapsulated inner frame left and right segments and crossmember.

A plurality of spaced apart brackets are preferably provided directly on the underside of the arcuate segment and are at least partially encapsulated by the foam material, reinforcing fabric and plastic. The brackets function as support and mounting means for the framing structure to a convertible automobile. The inner frame preferably defines a closed loop. The foam material is desirably a urethane and the reinforcing fabric is desirably fabricated of glass fiber with the plastic being a polyester. Preferably, a cowling is formed by the reinforcing fabric impregnated with plastic. The cowling extends downwardly from the rearward edge of the instrument panel ledge.

DETAILED DESCRIPTION OF A PREFERRED EMBODIMENT

Figure 1:
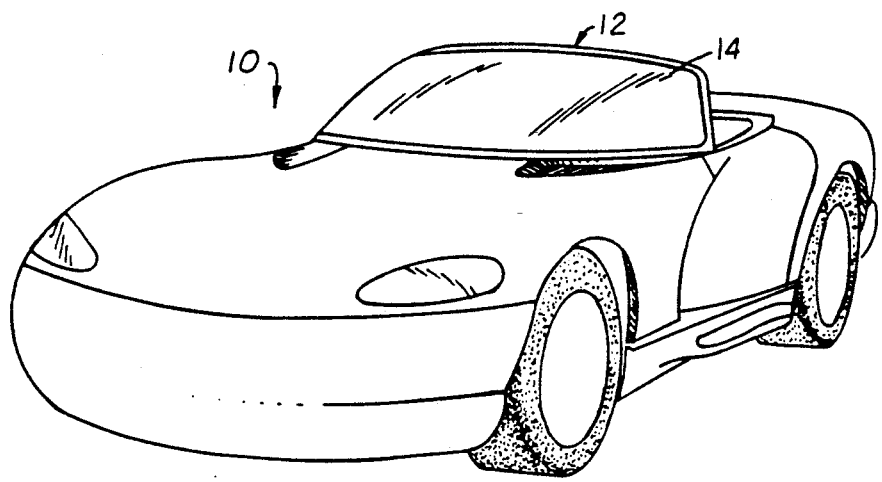
FIG. 1 is a view in perspective of a convertible automobile having the composite windshield framing structure forming one embodiment of the present invention mounted thereon.

Referring to FIG. 1, a convertible automobile 10 is illustrated. The composite windshield framing structure 12 of the present invention is mounted thereon. Windshield glass 14 is mounted in the framing structure.

Figure 2:
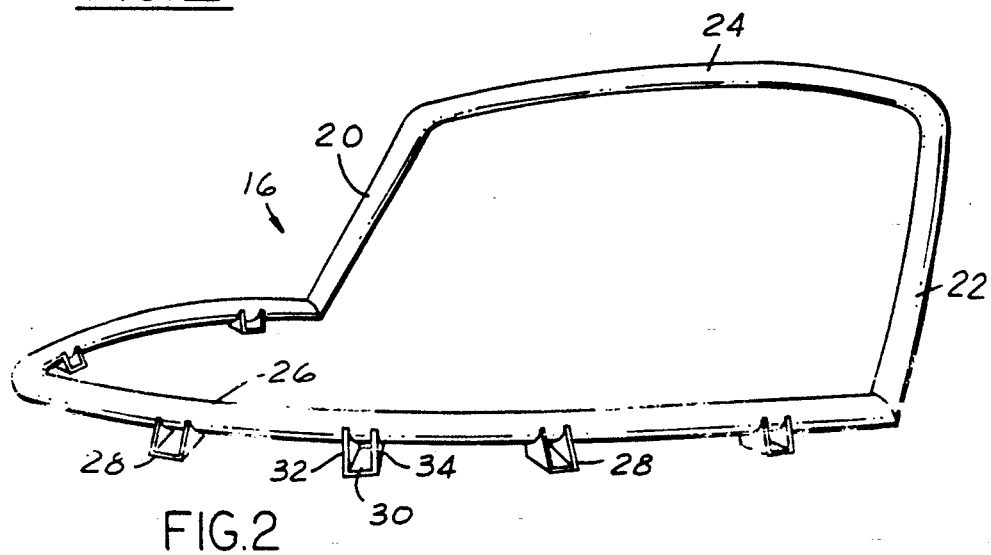
FIG. 2 is a view in perspective of the tubular metallic inner frame forming part of the composite windshield framing structure as viewed from the rear of the convertible automobile of FIG. 1.

Referring to FIG. 2, the windshield framing structure 12 includes a tubular metallic inner frame 16. The frame 16 is fabricated from, for example, steel tubing. The inner frame 16 includes upwardly extending left and right segments 20, 22, the terms "left" and "right" having the usual meaning in automotive terminology being positioned to the left and right of the driver respectively. A crossmember 24 extends between the upper ends of the left and right segments 20, 22. An arcuate segment 26 interconnects the lower ends of the left and right segments 20, 22. The arcuate segment 26 extends rearwardly with respect to the convertible automobile 10. The inner frame 16 thus defines a closed loop.

A plurality of spaced apart brackets 28 are provided directly on the underside of the arcuate segment 26. The brackets 28 may be permanently affixed in place by welding or may be loosely mounted prior to encapsulation of the inner frame 16 as will be later described. Each bracket includes a lower wall 30 and spaced apart upwardly extending sidewalls 32, 34 which extend from the transverse edges thereof. As will be noted in FIG. 5, the side walls include an angular edge 36 which extends rearwardly from a point spaced from the outer edge 38. The angulation of edge 36 facilitates encapsulation of the inner frame with foam material without interfering with the desired external configuration thereof. Forwardly angled edge 40 extends downwardly from the edge 36 and terminates in horizontal edge 42. This configuration provides a support ledge for the arcuate segment 26.

Figure 5:
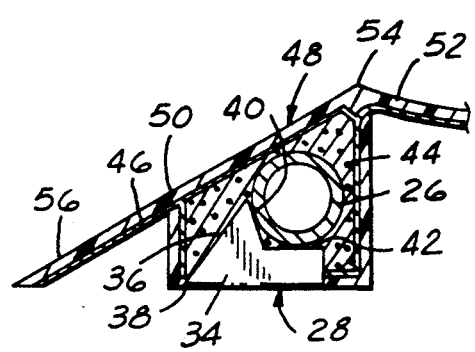
FIG. 5 is a sectional view taken substantially along the line 5—5 of FIG. 3 looking in the direction of the arrows.
Figure 6:
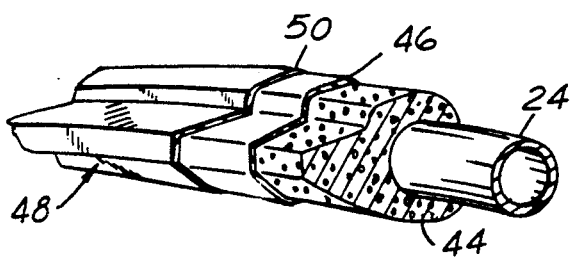
FIG. 6 is a view in perspective of the portion of the windshield framing structure included within the circle 6 of FIG. 3.
Figure 7:
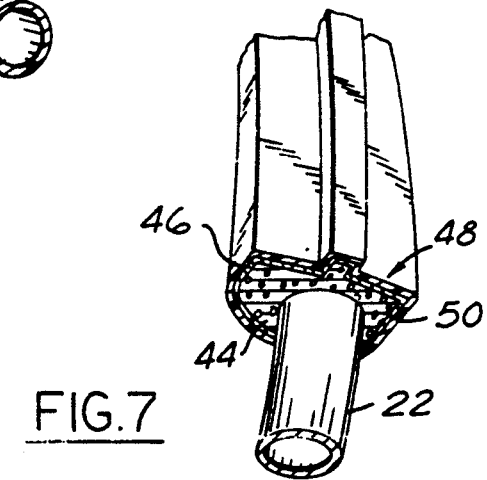
FIG. 7 is a perspective of the portion of the windshield framing structure included within the circle 7 of FIG. 3.

The inner frame 16 and brackets 28 are encapsulated in foam material 44. This is preferably accomplished in a mold. Urethane foam is preferably used. The urethane foam improves the stiffness of the final framing structure and provides the desired exterior configuration. The foam at least partially encapsulates the brackets 28 and entirely encapsulates the inner frame 16. The lower surface of the brackets 28 may be exposed as shown in FIG. 5 to facilitate the use of mounting fasteners to secure the framing structure in place on the convertible automobile 10.

Figure 3:
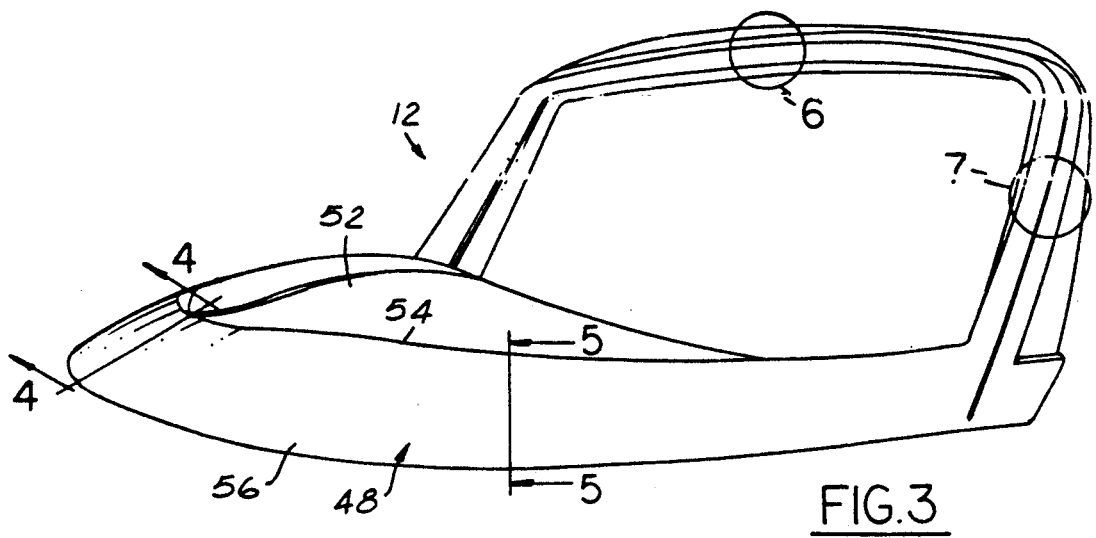
FIG. 3 is a view in perspective of the composite windshield framing structure as viewed from the rear of the convertible automobile of FIG. 1.
Figure 4:
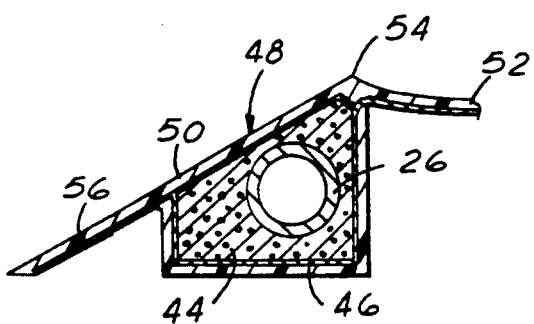
FIG. 4 is a sectional view taken substantially along the line 4—4 of FIG. 3 looking in the direction of the arrows.

A layer of reinforcing fabric 46 is laid over and overlies the structure which has been thus formed. The fabric may be, for example, glass fiber. Plastic material 48 is then applied over the fabric 46, impregnating the fabric and forming an outer layer portion 50. The plastic may be, for example, a polyester. The plastic is cured to a hardened state. As will noted in FIG. 3, the fabric 46 and plastic 48 extend across the arcuate segment 26 to define an instrument panel ledge 52. A portion of the plastic impregnated fabric extends downwardly from the rear edge 54 of the ledge 52 to define cowling 56 which is integrated into the instrument panel design and structure (not shown).

I claim:

1. A composite windshield framing structure for a convertible automobile comprising a tubular metallic inner frame including upwardly extending left and right segments interconnected by a crossmember extending between the upper ends thereof, the inner frame further including an arcuate segment extending rearwardly with respect to the convertible automobile, the arcuate segment interconnecting the lower ends of the left and right segments, foam material encapsulating the inner frame, a layer of reinforcing fabric impregnated with plastic overlying the foam material and further extending across the arcuate segment to define an instrument panel ledge, a windshield being mountable in the encapsulated inner frame left and right segments and crossmember, and a plurality of spaced apart brackets provided directly on the underside of the arcuate segment, said brackets being at least partially encapsulated by the foam material, reinforcing fabric and plastic, said brackets functioning as support and mounting means for the framing structure for the convertible automobile.

2. A composite windshield framing structure for a convertible automobile as defined in claim 1, wherein the inner frame defines a closed loop.

3. A composite windshield framing structure for a convertible automobile as defined in claim 1, wherein the foam material is a urethane.

4. A composite windshield framing structure for a convertible automobile as defined in claim 1, wherein the reinforcing fabric is fabricated of glass fiber.

5. A composite windshield framing structure for a convertible automobile as defined in claim 1, wherein the plastic is a polyester.

* * * * *